March 31, 1959 M. M. ADAMS 2,879,665
DETONATION METER

Filed Dec. 19, 1955 2 Sheets-Sheet 1

INVENTOR.
M. M. ADAMS
BY *Hudson & Young*
ATTORNEYS

United States Patent Office 2,879,665
Patented Mar. 31, 1959

2,879,665

DETONATION METER

Max M. Adams, Bartlesville, Okla., assignor to Phillips Petroleum Company, a corporation of Delaware Application December 19, 1955, Serial No. 553,786

10 Claims. (Cl. 73—35)

This invention relates to apparatus for measuring detonation in internal combustion engines.

It is considerably more difficult to measure detonation in aircraft engines than in other types of internal combustion engines because the jacket temperature and operating conditions are so severe that conventional internal pickup devices cannot readily be employed. Also, the random time variation of the intervals between successive knocks causes indicator readings to be a function of the times of occurrence when conventional integrating methods are used. Instruments presently approved for the evaluation of aviation fuels by the supercharge method utilize a frequency selection procedure for the detection of detonation. Certain frequencies are selected as being representative of the detonation. These selected frequencies are amplified through filter networks which reject frequencies other than those under consideration. The transmitted frequencies are integrated and the result is considered to be representative of the knock intensity.

The present invention is concerned primarily with providing improved apparatus for evaluating aviation fuels by the supercharge method. This method is described in detail in ASTM Manual of Engine Testing Methods for Rating Fuels, American Society for Testing Materials, Philadelphia, Pa. (1948). In accordance with a present preferred embodiment of the present invention, the envelope of the output signal from a pickup is measured during the interval at which detonation can occur. An external pickup of the magnetostrictive type is preferred. The output from such a pickup is applied through a selector network which selects and passes those signals which are of appreciably greater magnitude than the immediately preceding signals. Selection is, therefore, based upon relative magnitude rather than absolute magnitude. The transmitted signals energize a pulse generator which provides output signals of time duration which are representative of the amplitude of the detonation signal. The pulse generator permits a tube to conduct to charge a storage device, such as a capacitor. The charge on the capacitor is measured by a meter to provide an indication of the detonation. A gating circuit is provided to render the amplifier operative only during a preselected portion of the engine cycle. This prevents the passage of extraneous vibrations which are not representative of knock in the cylinder.

Accordingly, it is an object of this invention to provide improved apparatus for measuring quantitatively detonation in internal combustion engines.

Another object is to provide an electrical selector circuit which transmits pulses selected on the basis of magnitude with respect to immediately preceding pulses.

A further object is to provide apparatus for measuring the product of the amplitude and the time interval between adjacent pulses of a series of pulses to obtain a quantity representative solely of amplitude and independent of the time interval between randomly occurring pulses.

Other objects and advantages and features of the invention should become apparent from the following detailed description taken in conjunction with the accompanying drawing in which.

Before considering the detailed circuit of the detonation meter of this invention, it is worthwhile to review the operation of a resistance-capacitance averaging circuit. If pulses are impressed at regular intervals on such a circuit the average voltage to which the capacitor is charged is representative of the intensity or amplitude of the pulses. If the frequency of the impressed pulses is increased, the capacitor voltage increases proportionately; if the frequency is decreased, there is a corresponding reduction in the voltage to which the capacitor is charged. This is true if the frequency denotes a regular and constant time interval between pulses. If, however, the time interval between successive pulses is entirely random it is necessary to apply a correction factor to the amplification of each pulse in order that its contribution to the total voltage be a true indication of its amplitude. It is not possible to accomplish this result by averaging the time interval between the pulses because variations in time interval would lead to fluctuations in capacitor voltage even though all the pulses were of identical amplitude. If, however, the amplitude of each pulse is multiplied by the time interval since the previous pulse, the capacitor voltage, in the ideal situation, remains a function of amplitude only and is independent of the time interval. This multiplication can be approached by the use of the formula $$e_c = \frac{1}{C}\int i\,dt$$

which states that the voltage ($e_c$) to which a capacitor (C) is charged is the time integral of the current ($i$) flowing into the capacitor. In accordance with the present invention, a detonation meter is provided which makes use of this relationship.

Figure 1:
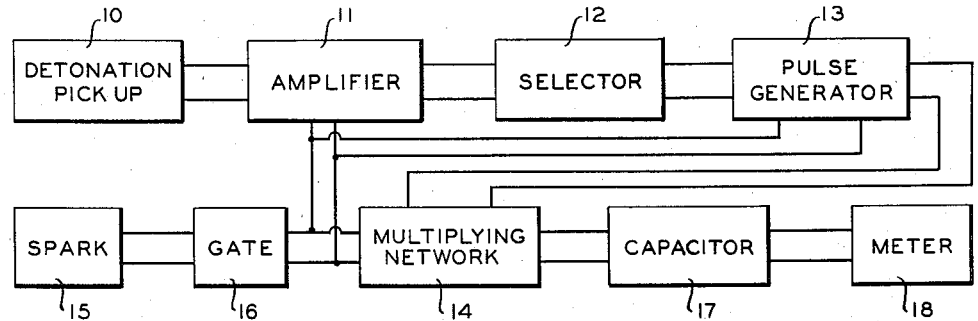
Figure 1 is a schematic representation of the detonation meter of this invention.

Referring now to the drawing in detail and to Figure 1 in particular, there is shown a detonation pickup 10 which preferably is of the magnetostrictive type that is mounted externally of the engine cylinder. A suitable pickup for use in this manner is described in U. S. Patent 2,245,318. The output signal from pickup 10 is applied to the input of an amplifier 11. The amplified signal is applied through a selector network 12 to energize a pulse generator 13. Network 12 is designed to transmit pulses which are of amplitudes substantially different from the amplitudes of the preceding pulses. The output of pulse generator 13 is applied to the first input of a multiplying network 14. A spark mechanism 15 provides a pulse at a predetermined point in the cycle of the engine being tested. This pulse can be generated at the time the ignition pulse is supplied to the engine spark plug. The pulse generated by mechanism 15 is applied to a gate circuit 16 which controls the operation of amplifier 11. The output signal from gate circuit 16 permits amplifier 11 to transmit signals from pickup 10 during only a portion of the engine cycle. Pulses from gate circuit 16 are used to generate one signal input of multiplying network 14 which performs the multiplication previously described. The output of network 14 charges a capacitor 17. The charge on capacitor 17 is indicated by meter 18.

Figure 2:
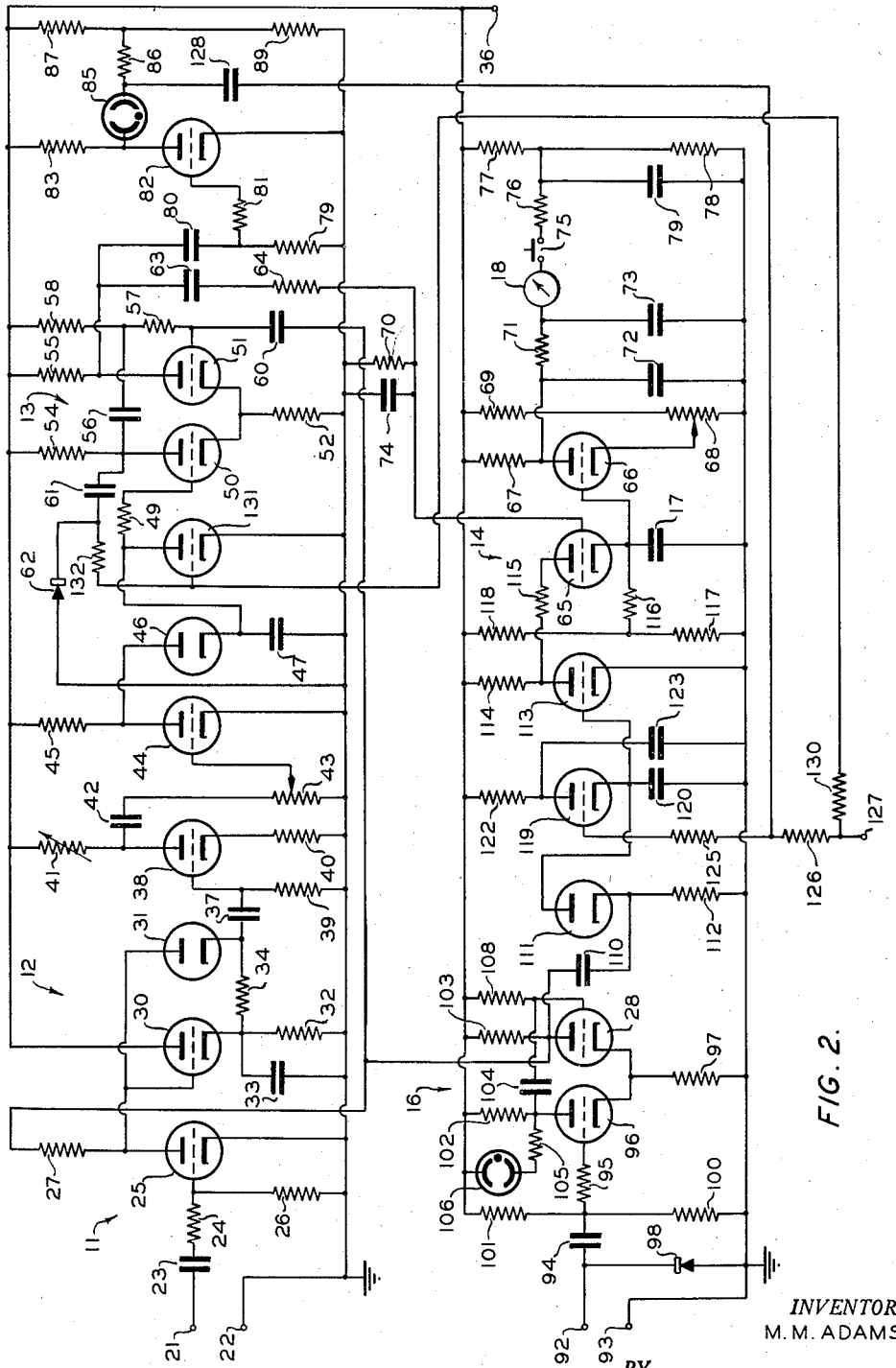
Figure 2 is a schematic circuit diagram of a present preferred embodiment of this invention.

The electrical circuit of the apparatus of Figure 1 is illustrated in detail in Figure 2. Input terminals 21 and 22 are connected to the output terminals of pickup 10. Terminal 21 is connected through a capacitor 23 and a resistor 24 to the control grid of a triode 25 which comprises amplifier 11. The control grid of triode 25 is connected to ground through a resistor 26. Input terminal 22 is connected directly to ground. The cathode of triode 25 is connected directly to ground. The anode of triode 25 is connected through a resistor 27 to the anode of a triode 28 which forms a portion of gate circuit 16.

The anode of triode 25 is also connected to the control grid of a triode 30 and to the anode of a diode 31. The cathode of triode 30 is connected to ground through a resistor 32 which is shunted by a capacitor 33. The cathode of triode 30 is connected to the cathode of diode 31 through a resistor 34. The anode of triode 30 is connected to a positive potential terminal 36. Triode 30 and diode 31 and the circuit components associated therewith comprise selector network 12.

The cathode of diode 31 is connected through a capacitor 37 to the control grid of a triode 38. The control grid of triode 38 is connected to ground through a resistor 39, and the cathode of triode 38 is connected to ground through a resistor 40. The anode of triode 38 is connected to terminal 36 through a variable resistor 41. The anode of triode 38 is connected to ground through a capacitor 42 and a potentiometer 43 which are connected in series relationship. The contactor of potentiometer 43 is connected to the control grid of a triode 44. The cathode of triode 44 is connected to ground, and the anode of triode 44 is connected to terminal 36 through a resistor 45. The anode of triode 44 is connected to the anode of a diode 46. The cathode of diode 46 is connected to the first terminal of a capacitor 47. The second terminal of capacitor 47 is connected to ground.

The first terminal of capacitor 47 is connected through a resistor 49 to the control grid of a triode 50 which forms the first stage of a multivibrator. The cathode of triode 50 is connected to the cathode of a second triode 51, the two cathodes being connected to ground through a common resistor 52. The anodes of triodes 50 and 51 are connected to terminal 36 through respective resistors 54 and 55. The anode of triode 50 is connected to the control grid of triode 51 through a capacitor 56 and a resistor 57 which are connected in series relationship. The junction between capacitor 56 and resistor 57 is connected to terminal 36 through a resistor 58. The control grid of triode 51 is connected through a capacitor 60 to the anode of triode 28 in gate circuit 16. The anode of triode 50 is connected through a capacitor 61 and a rectifier 62 to ground.

The anode of triode 51 is connected through a capacitor 63 and a resistor 64, which are connected in series relationship, to the control grid of a triode 65 which forms a portion of multiplying network 14. The cathode of triode 65 is connected to the first terminal of capacitor 17. The control grid of triode 65 is connected to ground through parallel connected resistor 70 and capacitor 74. The second terminal of capacitor 17 is connected to ground. The first terminal of capacitor 17 is connected to the control grid of a triode 66. The anode of triode 66 is connected to terminal 36 through a resistor 67. The cathode of triode 66 is connected to the contactor of a potentiometer 68. Potentiometer 68 and a resistor 69 are connected in series relationship between ground and terminal 36. The anode of triode 66 is connected through a filter resistor 71 to the first terminal of meter 18. Filter capacitors 72 and 73 are connected between ground and the respective end terminals of resistor 71. The second terminal of meter 18 is connected through a time delay relay switch 75 and series connected resistors 76 and 77 to terminal 36. The junction between resistors 76 and 77 is connected to ground through a resistor 78 which is shunted by a capacitor 79.

An indicator circuit is connected to the output of pulse generator 13 to provide a visual indication of the occurrence of detonation pulses. The anode of triode 51 is connected through a capacitor 80 and a resistor 81 to the control grid of a triode 82. A resistor 79 is connected to ground from the junction of capacitor 80 and resistor 81. The cathode of triode 82 is connected to ground. The anode of triode 82 is connected to terminal 36 through a resistor 83. The anode of triode 82 is also connected to terminal 36 through an indicator lamp 85 and series connected resistors 86 and 87. The junction between resistors 86 and 87 is connected to ground through a resistor 89.

Input terminals 92 and 93 are connected to the respective output terminals of spark mechanism 15. Terminal 92 is connected through a capacitor 94 and a resistor 95 to the control grid of a triode 96 which forms the first stage of a multivibrator that comprises gate circuit 16. The cathodes of triodes 96 and 28 are connected to one another and to ground through a common resistor 97. Input terminal 93 is connected directly to ground. A rectifier 98 is connected between terminal 92 and ground to short out negative pulses. A resistor 100 is connected between ground and the junction between capacitor 94 and resistor 95. This junction is connected to terminal 36 through a resistor 101. The anodes of triodes 96 and 28 are connected to terminal 36 through respective resistors 102 and 103. The anode of triode 96 is connected through a capacitor 104 to the control grid of triode 28. The anode of triode 96 is also connected to terminal 36 through a resistor 105 and an indicating lamp 106. The control grid of triode 28 is connected to terminal 36 through a resistor 108.

The anode of triode 28 is connected through a capacitor 110 to the cathode of a diode 111. The cathode of diode 111 is connected to ground through a resistor 112. The anode of diode 111 is connected to the control grid of a triode 113. The cathode of triode 113 is connected to ground, and the anode of triode 113 is connected to terminal 36 through a resistor 114. The anode of triode 113 is connected through a resistor 115 to the anode of triode 65. The cathode of triode 65 is connected to ground through series connected resistors 116 and 117. The junction between these resistors is connected to terminal 36 through a resistor 118.

The anode of diode 111 is also connected to the cathode of a triode 119. The cathode of this triode is connected to the first terminal of a capacitor 120. The second terminal of capacitor 120 is connected to ground. The anode of triode 119 is connected to terminal 36 through a resistor 122 and to ground through a capacitor 123. The control grid of triode 119 is connected through series connected resistors 125 and 126 to a negative potential terminal 127. The junction between resistors 125 and 126 is connected through a capacitor 128 to the junction between lamp 85 and resistor 86. Terminal 127 is connected through a resistor 130 to the control grid of a triode 131. The cathode of triode 131 is connected to ground. The anode of triode 131 is connected to the first terminal of capacitor 47. The control grid of triode 131 is connected through a resistor 132 to the junction between capacitor 61 and rectifier 62.

The circuit components of one particular embodiment of this invention were as follows (resistances are expressed in ohms and capacitances in microfarads).

| Component: | Value |
| --- | --- |
| 24 | 1,000,000 |
| 26 | 220,000 |
| 27 | 180,000 |
| 32 | 8,200,000 |
| 34 | 1,200,000 |
| 39 | 5,100,000 |
| 40 | 8,200 |
| 41 | 50,000 |

| Component: | Value |
|---|---|
| 43 | 1,000,000 |
| 45 | 100,000 |
| 49 | 680,000 |
| 132 | 220,000 |
| 52 | 12,000 |
| 54 | 18,000 |
| 55 | 18,000 |
| 57 | 620,000 |
| 58 | 1,000,000 |
| 64 | 5,600,000 |
| 70 | 3,300,000 |
| 79 | 5,100,000 |
| 81 | 15,000,000 |
| 83 | 39,000 |
| 86 | 270,000 |
| 87 | 470,000 |
| 89 | 470,000 |
| 95 | 510,000 |
| 100 | 220,000 |
| 101 | 680,000 |
| 102 | 18,000 |
| 105 | 56,000 |
| 97 | 12,000 |
| 103 | 18,000 |
| 108 | 1,000,000 |
| 112 | 33,000 |
| 125 | 1,000,000 |
| 126 | 1,000,000 |
| 130 | 1,000,000 |
| 122 | 820,000 |
| 114 | 180,000 |
| 117 | 100,000 |
| 116 | 28,200,000 |
| 118 | 1,000,000 |
| 115 | 4,000,000 |
| 67 | 680,000 |
| 68 | 25,000 |
| 71 | 180,000 |
| 76 | 47,000 |
| 77 | 180,000 |
| 78 | 150,000 |
| 23 | 0.01 |
| 33 | 1.0 |
| 37 | 0.01 |
| 42 | 0.01 |
| 47 | 0.01 |
| 61 | 0.01 |
| 56 | 0.47 |
| 60 | 0.00037 |
| 63 | 0.01 |
| 80 | 0.01 |
| 74 | 0.001 |
| 128 | 0.1 |
| 94 | 0.001 |
| 104 | 0.047 |
| 110 | 0.000200 |
| 120 | 1.0 |
| 123 | 0.1 |
| 17 | 1.0 |
| 72 | 10.0 |
| 73 | 10.0 |
| 79 | 10.0 |

Triodes 25, 30, 82, 65 and 66 were each one-half of a tube type 6SL7. Diode 31 was one-half of such a tube with the anode and control grid connected. Triodes 38, 44, 49, 50, 51, 96, 28, 119 and 113 were each one-half of a tube type 6SN7. Diode 46 was one-half of such a tube with control grid and anode connected and diode 111 was one-half of such a tube with control grid and cathode connected.

The time constant of resistor 57-capacitor 60 is small compared to the time constant of resistor 58-capacitor 56, 0.00023 second to 0.47 second, for example.

The detailed operation of the detonation meter of this invention will now be described. The output pulses from pickup 10 are applied to the input of amplifier 11 which is formed by triode 25. The anode of triode 25 normally is about 60 volts and rises to about 90 volts when a gate event occurs. Triode 30 and diode 31 form selector network 12. The voltage on the anode of triode 25 is applied to the control grid of triode 30 which is connected as a cathode follower. After a few input pulses have been applied to the control grid of triode 30, the cathode of triode 30 is driven to a slightly more positive voltage than is the control grid. The cathode of diode 31 is connected through resistor 34 to the cathode of triode 30 so that the cathode of diode 31 normally is more positive than the anode thereof. Thus, if the average incoming pulses vary only slightly in amplitude over a few cycles, there is no transmission of pulses through selector 12. However, if a single large pulse is transmitted through amplifier 11, such a pulse is transmitted through selector 12 to the control grid of triode 38. This should be evident because a sudden pulse drives the anode of tube 31 to a sufficiently positive value to cause the tube to conduct.

Selector network 12 is particularly useful when the detonation meter is employed with an external pickup to measure detonation by the supercharged method. Under low boost conditions no appreciable output is developed in the pickup during normal combustion. However, at higher boosts with more detonation resistant fuels, an audible rumble exists which is not detonation, but which causes a decided increase in the output of the pickup. By the use of selector network 12, false indications of detonation are eliminated because the rejection is based upon the usually occurring events rather than upon absolute magnitudes.

The pulses which are transmitted through selector 12 are impressed upon the grid of triode 38 which forms a variable gain amplifier that is adjusted by variable resistor 41 in the anode circuit. Triode 44 comprises a second stage of amplification which is coupled through tube 46 to capacitor 47. The voltage to which capacitor 47 is charged is a function of the D.C. plate voltage on triode 44 as well as the level of the A.C. signal impressed upon the grid of triode 44. The gain of triode 44 as well as the quiescent D.C. plate voltage is controlled by the setting of potentiometer 43.

Triodes 50 and 51 form a single-shot multivibrator wherein the cathode and anode resistors are selected so that an output square wave is generated which is a linear function of the D.C. voltage applied to the multivibrator input. This D.C. voltage is the value to which capacitor 47 is charged through diode 46. In the particular embodiment of this invention described herein, the multivibrator will not fire if the D.C. voltage on capacitor 47 is less than about 34 volts. If this voltage rises above about 77 volts the multivibrator oscillates freely. However, between these values the width of the square positive pulse developed at the anode of triode 51 is extremely linear with the input voltage applied to the grid of triode 50. Capacitor 47 remains charged until the multivibrator returns to its quiescent state. At this time capacitor 47 is discharged through triode 131 by the positive trailing edge of the square wave at the anode of triode 50 being differentiated. The multivibrator is triggered at the end of each gate pulse by a pulse being applied to the grid of triode 51 through capacitor 60. If the signal voltage on capacitor 47 is sufficiently high, the multivibrator will fire. Otherwise the multivibrator remains in the quiescent state.

When a detonation event occurs, the positive square wave signal appearing at the anode of triode 51 performs several functions. This signal is applied to the control grid of triode 65 so that the triode can conduct. The signal on the anode of triode 51 is amplified by triode 82 so that indicator lamp 85 is illuminated.

The duration of the square wave pulse applied to the control grid of triode 65 determines the time interval during which current flows through the triode to charge capacitor 17. This corresponds to the time derivative in the expression $$e_c = \frac{1}{C}\int i\,dt$$

Terminals 92 and 93 are connected to a spark producing device so that a pulse is applied to the control grid of triode 96 at a predetermined time with respect to the engine cycle. In the supercharge method, the spark advance normally is 45° before top dead center. In the particular embodiment of the invention described herein the circuit components of gate circuit 16 are selected so that the positive square wave developed on the anode of triode 28 corresponded to approximately 135° of rotation of the engine crank shaft. This results in the gate being opened during the period of 45° before top dead center to 90° after top dead center on the power stroke. When gate circuit 16 is energized, lamp 106 is illuminated to provide a visual indication of the operation. The output pulses from gate 16, which is a multivibrator formed by triodes 96 and 28, provide three functions. The voltage at the anode of triode 28 is applied to the anode of triode 25 of amplifier 11 to allow the amplifier to pass detonation pulses. This voltage also provides a trigger pulse to the grid of triode 51, as previously mentioned. Also, capacitor 110 is charged to a voltage of approximately 130 volts each time the gate is triggered.

Capacitor 110 discharges through diode 111 to charge capacitor 120 which functions as a signal storage means. Capacitor 120 is large in comparison to capacitor 110 and thus charges stepwise, with respect to time, in a negative direction. This causes the voltage at the anode of triode 113 to increase stepwise in small increments as each gating cycle occurs. Whenever a detonation event occurs, capacitor 120 is discharged to ground potential through triode 119. This occurs because the detonation pulses are applied to the control grid of triode 119 through capacitor 128 and resistor 125. When capacitor 120 returns to ground potential, the anode voltage of triode 113 falls to a value of approximately 25 volts. The voltage on the anode of triode 113 follows a triangular wave pattern and rises stepwise from this minimum value following each gating cycle. The voltage on the anode of triode 113 is applied through a large resistor 115 to the anode of triode 65. The high resistor 115 converts the voltage source at the anode of triode 113 to appear as a current source so that conduction through triode 65 is substantially constant during the time interval the grid is pulsed by the signal from generator 13.

The cathode of triode 65 is connected through resistor 116 to a point on the voltage dividing network of resistors 117 and 118 which is maintained at approximately 27 volts. The voltage across triode 65 is zero immediately following detonation and then increases linearly with respect to time to a maximum value of approximately 275 volts. It should be noted that the grid of triode 65 normally is beyond the cutoff value except when a pulse is transmitted through generator 13. The widths of these pulses are proportional to the intensities of the detonation events. The current flowing into capacitor 17 thus consists of pulses wherein the rate of flow is proportional to the time interval since the last previous detonation event and the time of flow is proportional to the detonation intensity. If such flow is plotted as a function of time, the area of a series of rectangular pulses represents the charge applied to capacitor 17. This charge is slowly bled off through resistor 116 so that the average charge on the capacitor is representative of the detonation intensity and is independent of the time interval between pulses. The voltage across capacitor 17 controls the conduction by triode 66 and this in turn is indicated by a microammeter 18. A time delay switch 75 is provided to prevent damage to meter 18 when the instrument is initially turned on. Switch 75 can be selected to close approximately 30 seconds after the instrument is energized, for example.

Figure 3:
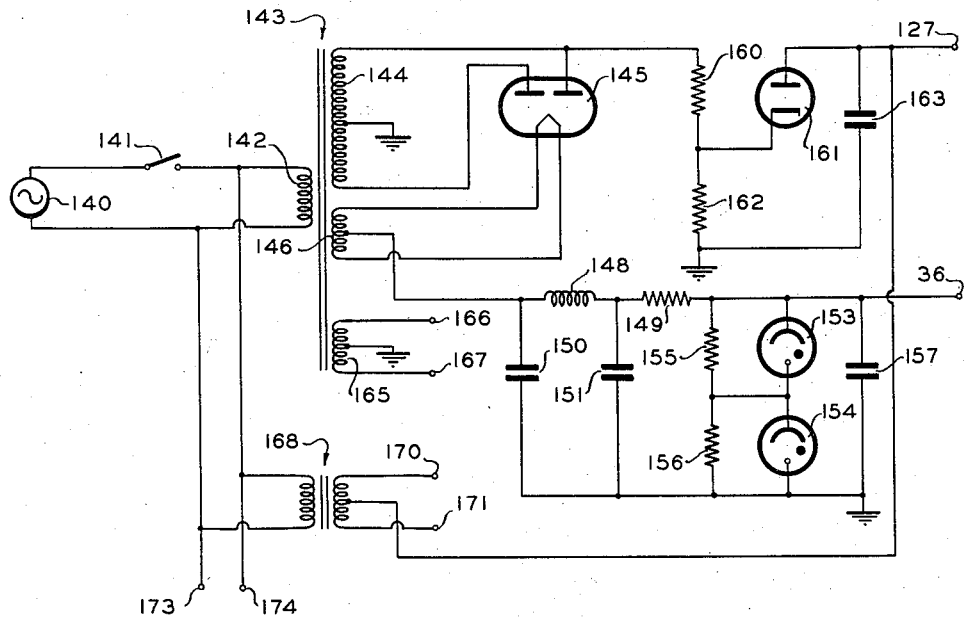
Figure 3 is a schematic circuit diagram of a suitable power supply circuit to energize the circuit of Figure 2.

A suitable power supply to energize the circuit of Figure 2 is illustrated in Figure 3. A source of alternating current 140 is applied through a switch 141 to the primary winding 142 of a transformer 143. The end terminals of the first secondary winding 144 are connected to the respective anodes of a double diode 145. The center tap of transformer winding 144 is connected to ground. The cathode of diode 145 is connected across a second secondary winding 146 of transformer 143. The center tap of winding 146 is connected to terminal 36 through a filter inductor 148 and a resistor 149. Capacitors 150 and 151 are connected between ground and the respective end terminals of inductor 148. Voltage regulating tubes 153 and 154 are connected in series relationship between terminal 36 and ground. The junction between these tubes is connected to terminal 36 through a resistor 155 and to ground through a resistor 156. A capacitor 157 is connected in parallel with tubes 153 and 154. The voltage appearing at terminal 36 is thus maintained at a steady positive potential.

One end terminal of transformer winding 144 is connected to the cathode of a diode 161 through a resistor 160. The cathode of diode 161 is connected to ground through a resistor 162. The anode of diode 161 is connected to terminal 127. A capacitor 163 is connected between terminal 127 and ground. The voltage appearing at terminal 127 is thus maintained at a steady negative potential.

A third secondary winding 165 of transformer 143 is connected to respective terminals 166 and 167. These terminals are connected to the heaters of tubes 31, 38, 44, 46, 131, 50, 51, 96, 28, 111 and 161. The center tap of transformer winding 165 is connected to ground.

The primary winding of a second transformer 168 is connected in parallel with transformer winding 142. The end terminals of the secondary winding are connected to output terminals 170 and 171. These terminals are connected to the heaters of tubes 30, 82, 119, 113, 65 and 66. The center tap of the secondary winding of transformer 168 is connected to terminal 127. This negative bias on the heater of triode 119 is desirable to prevent electron leakage from the cathode to the filament of the tube. Current source 140 is also connected to output terminals 173 and 174 which energize the heater of time delay relay 75. This results in switch 75 being closed a predetermined time after switch 141 is closed.

In the above-described embodiment of this invention, the circuit components of Figure 3 were as follows (resistances being expressed in ohms and capacitances in microfarads).

| Component: | Value |
|---|---|
| 160 | 100,000 |
| 162 | 10,000 |
| 149 | 1,000 |
| 155 | 100,000 |
| 156 | 1,000,000 |
| 163 | 2.0 |
| 150 | 20.0 |
| 151 | 20.0 |
| 157 | 20.0 |

Source 140 supplied current at 60 cycles per second, 115 volts. The voltage at terminal 36 was +300 volts and the voltage at terminal 127 was −42 volts. Diode 145 was a tube type 5Y3-GT; diode 161 was one-half of a tube type 6SN7 having anode and control grid connected; and tubes 153 and 154 each were type OA2.

From the foregoing description of this invention, it should be evident that there is provided an improved detonation meter which is particularly useful to measure the amplitude of randomly occurring pulses. While the invention has been described in conjunction with a

What is claimed is:

1. Apparatus for measuring detonation in internal combustion engines comprising a gate circuit, means to actuate said gate circuit at predetermined intervals, selector circuit means to transmit randomly occurring detonation pulses, means responsive to the output of said gate circuit to permit passage of detonation pulses to the input of said selector circuit means, a pulse generator to provide output pulses of duration representative of the amplitudes of input pulses applied thereto, means to apply the output of said selector circuit means to the input of said pulse generator, signal storage means, means to apply a signal to said storage means responsive to the output of said gate circuit, means responsive to the output of said selector circuit means to remove the signals stored on said storage means, signal multiplying means, means applying the output of said pulse generator to a first input of said multiplying means, means applying the output of said signal storage means to a second input of said multiplying means, and means to indicate the output of said multiplying means.

2. The combination in accordance with claim 1 wherein said means to indicate comprises a capacitor, means connected to the output of said multiplying means to charge said capacitor, means to discharge said capacitor, and means to measure the average charge on said capacitor.

3. The combination in accordance with claim 1 further comprising a transducer to convert mechanical vibrations into corresponding electrical signals, and means connecting the output of said transducer to the input of said means to pass detonation pulses.

4. Apparatus for measuring detonation in internal combustion engines comprising a gate circuit, means to actuate said gate circuit at predetermined intervals, pulse generating means to provide output pulses of duration representative of the amplitudes of input pulses applied thereto, means to apply detonation pulses to be measured to the input of said pulse generating means, signal storage means, means to apply a signal to said storage means responsive to the output of said gate circuit, means responsive to the output of said pulse generating means to remove signals stored on said storage means, signal multiplying means, means applying the output of said pulse generating means to a first input of said multiplying means, means applying the output of said signal storage means to a second input of said multiplying means, and means to indicate the output of said multiplying means.

5. Apparatus for measuring detonation in internal combustion engines comprising pulse generating means to provide output pulses of duration representative of the amplitudes of input pulses applied thereto, means to apply detonation pulses to be measured to the input of said pulse generating means, signal storage means, means to apply signals to said storage means at predetermined intervals, means responsive to the output of said pulse generating means to remove signals stored on said storage means, signal multiplying means, means applying the output of said pulse generator to a first input of said multiplying means, means applying the output of said signal storage means to a second input of said multiplying means, and means to indicate the output of said multiplying means.

6. The combination in accordance with claim 5 wherein said means to indicate comprises a capacitor, means connected to the output of said multiplying means to charge said capacitor, means to discharge said capacitor, and means to measure the average charge on said capacitor.

7. The combination in accordance with claim 1 wherein said selector circuit means comprises an electron tube having a cathode, an anode and a control grid; a resistance element and a capacitor connected in parallel relationship between said cathode and a point of reference potential; a source of potential connected between said reference potential and said anode; a unidirectional current element; and means connecting said element between said cathode and control grid so that electron flow through said element is in the direction toward said control grid.

8. The combination in accordance with claim 1 wherein said pulse generator comprises a multivibrator.

9. The combination in accordance with claim 1 wherein said gate circuit comprises a multivibrator; and wherein said means responsive to the output of said gate circuit to pass detonation pulses comprises an amplifier, and means responsive to the output of said multivibrator to render said amplifier operative to pass signals.

10. Apparatus for measuring detonation in an internal combustion engine comprising a first multivibrator; means to energize said first multivibrator at predetermined intervals; a signal storage means; means connecting the output of said first multivibrator to said storage means; an electron tube having an anode, a cathode and a control grid; means responsive to the output of said storage means to apply a potential to the anode of said tube; an amplifier; means responsive to the output of said first multivibrator to render said amplifier operative; means to apply detonation pulses to be measured to the input of said amplifier; selector circuit means to transmit randomly occurring pulses; means connecting the output of said amplifier to the input of said selector circuit means; a second multivibrator; means connecting the output of said selector circuit to the input of said second multivibrator; means responsive to the output of said second multivibrator to remove the charge from said storage means; means connecting the output of said second multivibrator to the control grid of said tube; a capacitor having one terminal connected to said cathode; means connecting the second terminal of said capacitor to a reference potential; electrical resistance means connected between said reference potential and said one terminal; and means to measure the average charge on said capacitor.

References Cited in the file of this patent

UNITED STATES PATENTS

| | | |
|---|---|---|
| 2,291,045 | Lancor | July 28, 1942 |
| 2,619,830 | Piety | Dec. 2, 1952 |
| 2,679,746 | De Boisblanc | June 1, 1954 |
| 2,735,616 | Hoadley | Feb. 21, 1956 |
| 2,737,584 | Hughes et al. | Mar. 6, 1956 |
| 2,741,428 | Elias | Apr. 10, 1956 |
| 2,744,196 | Hoeppner et al. | May 1, 1956 |

OTHER REFERENCES

Text, "Election Tube Circuits," Seely, McGraw-Hill, 1950, p. 152.